Aug. 15, 1939.　　　G. H. McINTYRE ET AL　　　2,169,611
APPARATUS FOR MANUFACTURING PORCELAIN ENAMEL AND GLASS
Filed May 20, 1935　　　2 Sheets-Sheet 1
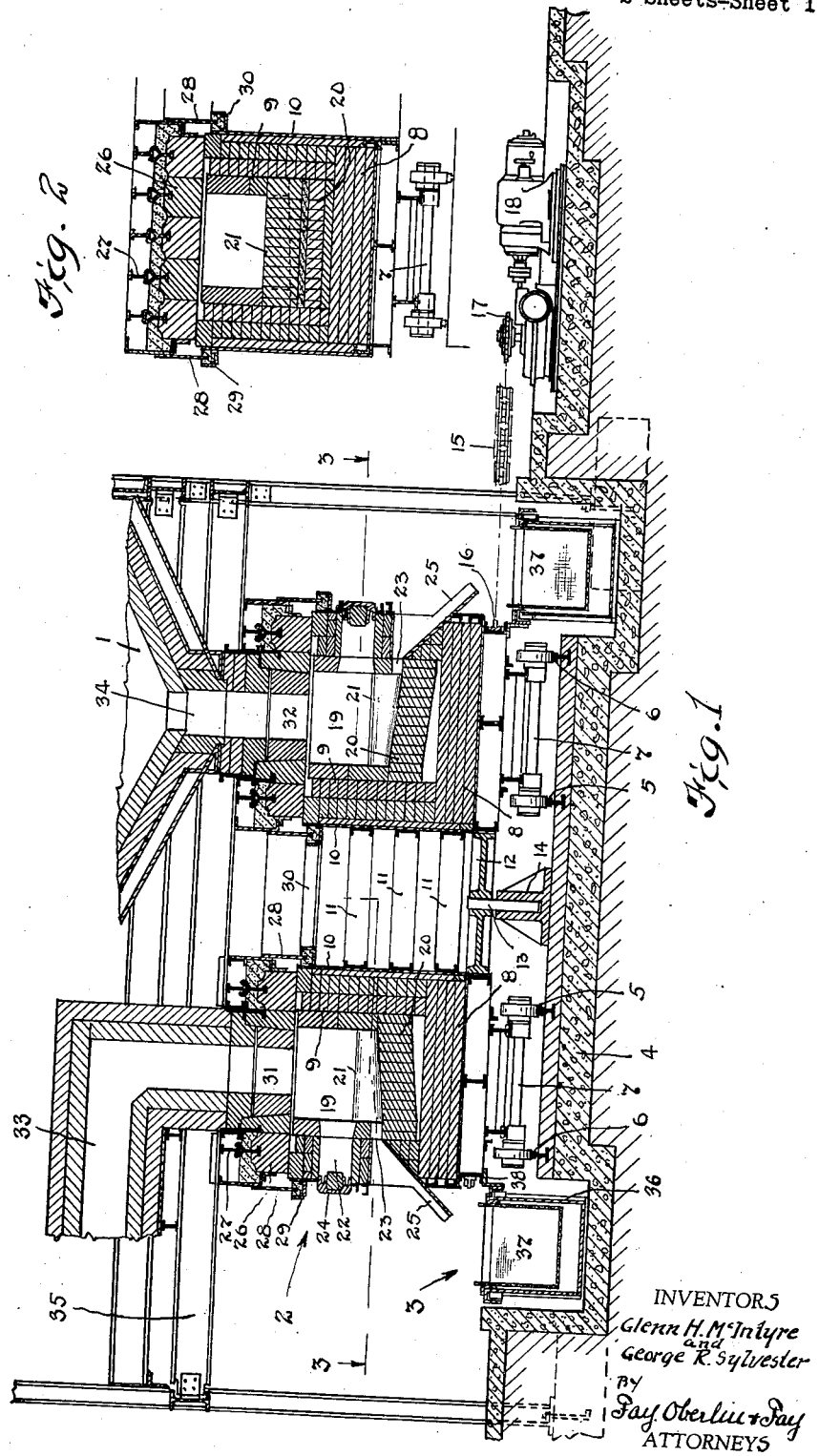
INVENTORS
Glenn H. McIntyre
and
George R. Sylvester
BY
Fay Oberlin & Fay
ATTORNEYS Aug. 15, 1939.  G. H. McINTYRE ET AL  2,169,611
APPARATUS FOR MANUFACTURING PORCELAIN ENAMEL AND GLASS
Filed May 20, 1935  2 Sheets-Sheet 2
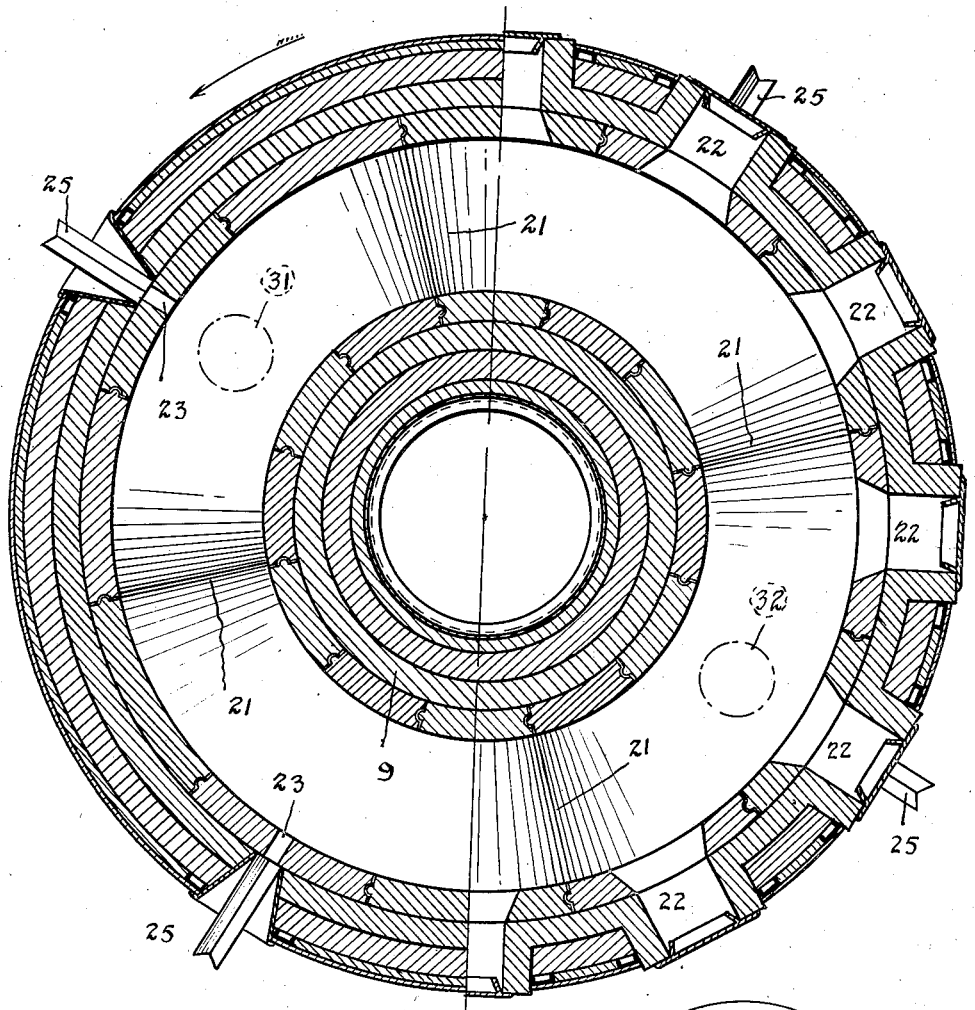
Fig. 3
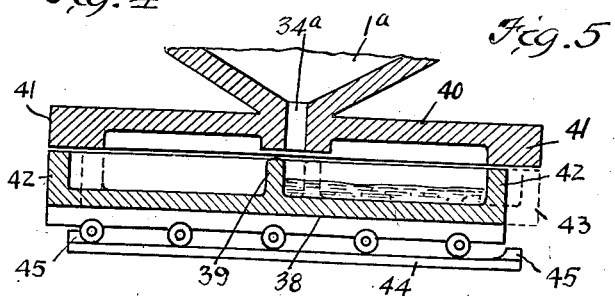
Fig. 4  Fig. 5
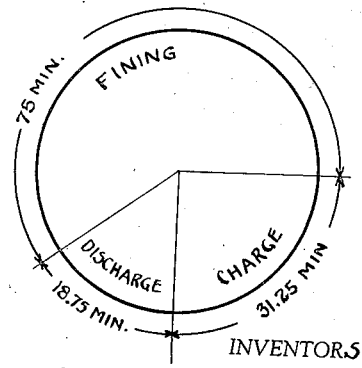
INVENTORS
Glenn H. McIntyre and
BY George R. Sylvester
Fay, Oberlin & Fay
ATTORNEYS.

Patented Aug. 15, 1939

2,169,611

UNITED STATES PATENT OFFICE 2,169,611

APPARATUS FOR MANUFACTURING PORCELAIN ENAMEL AND GLASS

Glenn H. McIntyre, Cleveland Heights, and George R. Sylvester, Shaker Heights, Ohio, assignors to Ferro Enamel Corporation, Cleveland, Ohio, a corporation of Ohio Application May 20, 1935, Serial No. 22,412

4 Claims. (Cl. 49—53)

This invention relates as indicated to porcelain enamel manufacture and more particularly to that stage of the manufacture of porcelain enamel wherein the enamel in its molten condition resulting from a melting together of the usual constituents forming the ultimate composition are subjected to a "fining" or refining action before being fritted, i. e., discharged into a bath of water and subsequently ground to provide the enamel slip which is applied to the article to be enameled, such as by dipping, brushing, spraying, etc.

The use of so-called fining chambers in the glass industry generally, is old and their function relatively well known. In order to somewhat more fully comprehend the nature of the improvements comprising the present invention, it is believed well to first briefly summarize the purposes for which this fining operation is carried on in both the plain glass and vitreous or porcelain enamel fields in order that the problems solved by the present invention may be somewhat more fully appreciated.

In the manufacture of clear glass, in which transparency of the finished product is the principal requisite thereof, it is essential that the molten materials from which the clear glass articles are ultimately formed be absolutely free from any undissolved or suspended material which, if included in the finished article, would result in an inferior product.

It has been common practice, therefore, in the fining or refining of the glass when in its molten condition to cause the same to flow at a relatively slow rate through an elongated fining chamber which is provided with a bridge wall extending transversely of the direction of flow and extending below the surface of the bath. The clear glass, when first discharged into the fining chamber, usually contains what is generally termed as "seeds" for the elimination of which the fining chamber is provided, as above described. These seeds are usually minute particles of unmelted material such as feldspar, silica, etc. and the bath usually contains air bubbles which, due to the molten condition of the bath, float at or near the surface thereof.

The bridge wall thus provided in clear glass fining chambers is for the purpose of damming back these seeds and to insure that only a clear glass is discharged to the article-forming apparatus usually associated with the discharge end of the fining chamber.

The purpose and function of the fining chamber in the manufacture of porcelain enamel is different from that just described in connection with the manufacture of clear glass and in certain respects it may be said that the function of the fining chamber in the manufacture of porcelain enamel is directly opposite to the function of the fining chamber in the manufacture of clear glass.

Porcelain enamel may be generally defined as a composition which includes usually a sodium-boro-silicate glass matrix in which are held in uniformly distributed suspension the opacifying compounds which are usually undissolved compounds such as sodium fluoride, compounds of antimony, etc. If the molten bath of the material to be used as a porcelain enamel were passed through a fining chamber of the character used in the manufacture of clear glass, as previously described, the effect of the bridge wall generally employed would be to separate out from and/or dissolve into the clear glass matrix those components which are essential in porcelain enamel to lend opacity thereto.

The function of the fining chamber in the manufacture of porcelain enamel is, therefore, not to separate out the crystalline or undissolved components such as the opacifying agents but to insure that the same will be evenly distributed throughout the entire bath so that the resultant product may have uniform characteristics such as opacity, etc.

At the present time practically all porcelain enamel material used in the production of enamel frit are melted by the batch process, i. e., a predetermined quantity of properly blended raw materials is deposited on the hearth of the furnace and then subjected to a sufficient degree of heat to first reduce the raw material to a molten condition and thereafter maintain the same at a sufficiently elevated temperature for a sufficient interval of time to effect a refining or "fining" of the bath, i. e., to insure a uniform distribution throughout the bath of the suspended opacifying constituents.

Prior art practices have, it is believed, conclusively shown that the best manner in which a bath of porcelain enamel materials may be properly fined is by maintaining the same in a substantially quiescent state for a sufficient period of time and at the proper temperature in order that the bath may be rendered homogeneous.

It is for this latter reason that no process for the continuous melting of porcelain enamel materials has found commercial acceptance to replace the batch process previously defined.

It is the principal object of this invention, therefore, to provide a method of and apparatus for fining materials such as porcelain enamel characterized by the fact that the proper fining operation, as previously described, may be carried on in conjunction with a continuous flow of melted raw materials from the smelting chamber and a substantially continuous flow of the fined material to the frit bath.

Other objects of the invention will appear as the description proceeds.

To the accomplishment of the foregoing and related ends, said invention, then, consists of the means hereinafter fully described and particularly pointed out in the claims, the annexed drawings and the following description setting forth in detail certain means and one mode of carrying out the invention, such disclosed means and mode illustrating, however, but one of various ways in which the principle of the invention may be used.

In said annexed drawings:

Fig. 1 is a transverse sectional view through an apparatus constructed in accordance with the principles of our invention and capable of carrying on the process comprising our invention; Fig. 2 is a fragmentary sectional view of a portion of the apparatus illustrated in Fig. 1 taken on a vertical plane extending at an angle to the plane of section of Fig. 1; Fig. 3 is a horizontal sectional view of the apparatus illustrated in Fig. 1 taken on planes respectively indicated by the lines 3—3; Fig. 4 is a representation of a modified form of the apparatus illustrated in Fig. 1; and Fig. 5 is a diagrammatic representation of one cycle of operation of the apparatus comprising this invention.

Referring now more specifically to the drawings and more especially to Fig. 1, the apparatus herein disclosed comprising a part of this invention and a means by which the process comprising this invention may be practiced may be generally divided into the following component elements, i. e., the melting or smelting chamber 1, the fining apparatus 2, and the fritting apparatus 3.

The present invention, since it pertains to the fining apparatus such as is generally indicated at 2 and its associated fritting apparatus, generally indicated at 3, is adaptable for use in conjunction with any suitable type of melting or smelting unit 1, i. e., the form of construction and operation of the melting unit 1 forms no part of this invention, only in that the method and apparatus presently to be explained as comprising this invention is designed particularly for use with smelting apparatus which operates on the continuous principle, i. e., is capable of discharging a continuous stream of melted enamel materials.

The smelting unit 1 may, therefore, be of any suitable construction such as for example, that illustrated in U. S. Patent No. 1,963,910 issued to Glenn H. McIntyre and Robert W. Stuart on June 19, 1934.

On a suitable foundation such as 4 there are arranged circular concentric tracks 5 and 6 upon which, by means of suitable trucks, such as 7, there is rotatably supported an annular refractory lined hearth 8 which is generally U-shaped in cross-section with the refractory lining 9 thereof held in place by an annular metallic shell 10 likewise substantially U-shaped in cross-section. The shell 10 or more particularly the hearth supported thereby is centrally reinforced by means of a plurality of annular rings 11 and the lower framework supporting the hearth 10 has a spider 12 secured thereto, which spider is mounted on a shaft 13 carried by a bearing 14.

The hearth assembly 8 may be rotated on the trucks 7 or more particularly the tracks 5 and 6 about the axis of the shaft 13 by means of a drive chain 15 trained about a sprocket 16 carried by the hearth assembly and a driving sprocket 17 which may be driven by means of a suitable power unit such as 18.

As previously indicated, the refractory lining 9 of the hearth assembly 8 provides an annular fining chamber 19 and the bottom 20 of such chamber is, at a plurality of equally spaced points elevated as at 21 above the normal level of the hearth bottom 20. These elevations 21 in the hearth divide the same into as many fining chambers as there are elevated portions 21. Fig. 2 is a transverse sectional view of one side of the annular hearth assembly 8 taken through one of the elevated portions 21 showing somewhat more clearly the difference in heighth between the elevations 21 and the normal upper surface 20 of the hearth bottom indicating the depth to which the enamel to be fined may collect on the hearth between successive ridges 21.

The outer wall of the hearth assembly 8 defining the fining chamber 19 is, as most clearly illustrated in Fig. 3, provided with a plurality of inspection and stirring openings 22 and drainage openings 23. The inspection and stirring openings 22 may be closed by means of removable doors such as 24 so constructed as to be readily opened to permit inspection of the bath within the fining chamber 19 and to permit a stirring thereof should the same be necessary. The drainage openings 23 have discharge spouts 25 associated therewith and such openings are normally closed by means of a ball of clay which, as is well known to those familiar with the art, is broken and removed when it is desired to draw off the contents of the fining chamber and replaced by means of a new ball or plug after the chamber has been drained and before the new charge of material is admitted to the fining chamber.

Stationarily supported above the annular hearth assembly 8 is an arch or roof assembly 26 which, as illustrated in the drawings, may be of conventional Dietrich suspended arch type carried by overhead beams such as 27. The arc or roof 26 is likewise preferably annular in form and extends into close proximity with the upper surface of the hearth assembly so as to effectively cover and seal the same. In order to insure a substantially perfect seal between the stationary roof or arch 26 and the rotatable hearth assembly 8, the vertically disposed baffles such as 28 respectively annular in form and arranged exteriorly and interiorly of the annular roof or arch 26 and carried thereby, extend into annular troughs 29 and 30, respectively, which carry sand to provide the conventional sand seal.

The stationary suspended arch or roof 26 is at diametrically opposite points provided with openings 31 and 32, respectively leading to a stack or flue 33 and the discharge opening 34 of the melting chamber 1. The stack 33 and the melting chamber 1 may be conveniently stationarily supported above the rotatable hearth assembly 8 by means of beams such as 35.

Mounted on the foundation 4 and substantially concentric with the axis of the shaft 13 is an annular water tank 36 which is substantially U-shaped in cross-section, the upper edges of such tank providing a track-way upon which may be movably supported baskets 37. The baskets 37 or more particularly the framework upon which such baskets rests and by which the same are carried around, are secured to the sub-structure of the hearth assembly 8 by any suitable means such as brackets 38. As the hearth assembly 8 is rotated, therefore, the baskets 37 which are preferably respectively positioned underneath the respective discharge spouts 25, are carried around with the hearth assembly in the water bath contained in the annular tank 36.

The operation of the above described form of apparatus is briefly as follows: The porcelain enamel material is, as previously indicated, first melted in any suitable form of continuous melting apparatus, generally indicated at 1, from which the molten material flows in a substantially continuous stream through the discharge opening 34.

By having reference to Fig. 3 the relative positions of the stack and feeding openings 31 and 32 respectively with respect to the bottom of the fining chamber in the hearth assembly 8 is most clearly shown.

Let it be assumed that the hearth assembly 8 is rotated in a counter-clockwise direction, as viewed in Fig. 3, i. e., in the direction of the arrow in the top of such figure. When the parts are thus positioned, the section of the hearth occupying the second quadrant will be receiving raw melted enamel from the opening 32. The section of the hearth bottom between the walls 21 in the first quadrant has just been filled with melted enamel. The material on the hearth bottom section in the fourth quadrant is in the course of fining and the charge on the hearth bottom in the third quadrant is in the course of being drawn off through the discharge opening 23 into the basket 37.

By a proper regulation of the rate of feed through the opening 32 with respect to the quantity of material which may be supported in any one of the units between adjacent partitions 21 and with respect to the speed of rotation of the hearth assembly 8, the enamel bath supported in any one section of the hearth may be permitted to fine for any desired length of time.

In Fig. 5 there is shown a diagrammatic representation of one cycle of operation of the previously described apparatus indicating in minutes the elapsed times for the various stages of the process which has been by actual operation determined to produce satisfactory results. The showing in Fig. 5 is based upon a four compartment fining chamber similar to that illustrated in Fig. 3 which is rotated so as to make one complete revolution in two hours and five minutes, i. e., 125 minutes. When the fining hearth is rotated at this speed and four compartments are provided in the hearth, then the charging time for any particular compartment is 31.25 minutes, i. e., one fourth of the total time required for one complete revolution of the hearth.

Actual operation of apparatus of the general character described has demonstrated that approximately 18.75 minutes is required in the removal of the discharge from the fining chamber and to place such fining chamber in condition to receive a new charge. These 18.75 minutes are consumed by first removing the plug from the discharge opening, then draining the charge from the fining chamber into the basket such as 37 and finally replacing a new clay plug in the discharge opening of the fining chamber so that when such chamber is moved into charging position underneath the opening 32, the fresh charge may be retained therein.

This leaves approximately 75 minutes in which the material in the fining bath is permitted to soak in order to eliminate the seeds therefrom. It is to be understood, of course, that in order to insure a proper homogeneous dispersion of the opacifying ingredients through the enamel bath, such bath may be stirred frequently, i. e., about every 15 minutes during the soaking period, i. e., while the bath is supported on the fining chamber hearth between ridges 21 and while the same moves from the discharge opening around to the station of discharge.

Numerous practical considerations which need not be mentioned at this point have resulted in a determination that the four compartment hearth, as shown in the drawings, is preferred. For different speeds of operation of the hearth, different diameters of the hearth and variations in the type of material to be fined will undoubtedly result in more efficient operation if a hearth having a larger or smaller number of compartments is employed. For example, if a six compartment hearth is employed, and the speed of rotation retained the same as above given, i. e., one revolution in the 125 minutes, the charging time will be reduced from 31.25 to approximately 20 minutes and since the time required to discharge remains substantially constant, the actual fining time would be increased by approximately 11 minutes to 86 minutes.

It should be kept in mind, of course, that as soon as the molten material begins to run into the fining chamber a fining action begins to take place. The actual time in which fining takes place is, therefore, considerably longer than the 75 minutes indicated on Fig. 5 when apparatus such as is illustrated for purposes of convenience is employed.

The speed of rotation, as well as the other factors which determine the duration of the various stages of the process may, of course, as previously indicated, vary with different types of material. The foregoing figures have been found to give best results when the material being operated upon is commercial porcelain enamel requiring what is believed to be an average length of time in the fining chamber in order to produce a uniform product.

It has been previously indicated that the fining chambers which have been commonly used in the manufacture of clear glass are not suited for use in the manufacture of porcelain enamel. Heretofore, the fining chambers which have been used for porcelain enamel manufacture have not been commercially practicable for the manufacture of clear glass, due to the fact that they have not been capable of operating on a continuous basis. The apparatus comprising this invention which makes possible the substantially continuous fining of the melting of porcelain enamel material makes possible for the first time the use in the clear glass industry of apparatus for fining which is also suited for use in the porcelain enamel field.

It has been found that the temperature at which the molten material should be maintained during the fining stage should, for best results, be between 1750° F. and 2000° F. The manner in which this temperature may be maintained in the apparatus which has been described will vary according to the variations in the operation of the apparatus, as well as the temperature of the molten material as it is discharged into the fining chamber. The apparatus, as most clearly illustrated in Fig. 2, is provided with an outlet stack for the burnt gases which is substantially diametrically opposite to the point at which the melting chamber leads into the fining chamber. It is contemplated that the apparatus herein described may be successfully operated by causing the gases from the melting chamber 1 to pass downwardly through the opening 32, thence to be divided to flow around opposite sides of the fining chamber to be discharged through the stack opening 31, thus maintaining a substantially even distribution of burning or burnt gases over the surface of the fining chamber hearth, i. e., the bath therein, to maintain the same at the proper temperature.

For certain purposes it may be impossible or impractical to properly maintain the temperature in the fining chamber by the sole use of the gases discharged from the melting chamber 1; in which case, it is within the contemplation of our invention to provide one or more booster burners projecting downwardly through the suspended arch or roof 26 to project a flame into the fining chamber. When such booster burners are employed, they will preferably be arranged so that the flame projected thereby will not impinge directly upon the bath of enamel material being fired but instead, will project on a rather flat incline so as to pass over the bath of material in the fining chamber.

The molten material after having been properly fined in the manner above described is, as previously indicated, drawn off through the discharge openings 23 and permitted to run down the spout 25 to be discharged into the basket 37 which is partially immersed in water. After a charge is collected by the basket 37 it may be lifted out of the trough 36 and dumped of its charge or a new basket introduced in its place.

The size of the baskets 37 should be such as to be capable of receiving at least one charge of melted material from the fining chamber, i. e., the amount of material which will be contained on the hearth bottom between adjacent ridges 21. After the enamel has been thus fritten in the basket 37, such basket may be lifted out, which action is facilitated by providing a hinge in the trough 25 so that the latter may fold out of the way.

In Figure 4, there is illustrated a modified form of apparatus constructed in accordance with certain of the principles previously defined, such apparatus comprising the usual melting chamber 1a, provided with a discharge opening 34a, beneath which there is positioned a shuttle car 38 which is centrally provided with a partition 39 dividing the body of the cart into two adjacent fining chambers. The arch 40 associated with the bottom of the melting chamber 1a serves as a closure for the cart 38 and the terminal portions of such arch 40 extend, as at 41, downwardly into close proximity to the edges 42 of the cart and are of sufficient width so that the cart may be moved from the full line to the dotted line position illustrated at 43 without the arch 40 uncovering the fining chambers in the cart 38. A suitable track such as 44 may, of course, be provided for the support of the cart 38 and stops 45 at opposite ends of such track eliminate the movement of the cart 38 to such an extent so that the central bridge wall 39 will lie on opposite sides of the discharge opening 34a as the cart is respectively at opposite ends of the track 44.

Suitable drainage openings may, of course, be provided in conjunction with each of the compartments in the cart 38 so as to make possible the withdrawal from such compartments of the charge of raw or melted material contained therein.

The principal advantage of the apparatus previously illustrated and described in Figs. 1 to 3 is that the melted material, when ultimately discharged into the fritting basket, has had an opportunity to soak for an appreciable length of time without any possibility of contamination by material which has just been discharged from the melting chamber. This insures that only such material as has been properly fined will be permitted to be discharged. The apparatus comprising our invention is, therefore, capable of carrying on the process comprising our invention which comprises the continuous melting of the raw materials which comprise the finished product and a continuous fining of such melted raw materials without any possibility of contamination of material prior to its discharge which has either been completely or partially refined by raw material which has just been discharged from the melting chamber.

Other modes of applying the principle of our invention may be employed instead of the one explained, change being made as regards the means and the steps herein disclosed, provided those stated by any of the following claims or their equivalent be employed.

We, therefore, particularly point out and distinctly claim as our invention:

1. In apparatus for the refining of a continuous stream of melted porcelain enamel material, glass and the like which comprises the combination of means for discharging a continuous stream of melted material, an annular fining chamber divided into a plurality of independent sections, means for moving said fining chamber relatively to said stream of melted material to successively fill different compartments of said fining chamber, and a water bath around said fining chamber into which the contents of said compartment may be successively discharged.

2. In apparatus for the refining of a continuous stream of melted porcelain enamel material, glass and the like which comprises the combination of means for discharging a continuous stream of melted material, an annular fining chamber divided into a plurality of independent sections, means for moving said fining chamber relatively to said stream of melted material to successively fill different compartments of said fining chamber, an annular water bath associated with said fining chamber, and a perforate basket in said water bath for the reception of fined material discharged from said compartments.

3. In apparatus of the character described, the combination of means for discharging a continuous stream of melted material, an annular fining chamber divided into a plurality of compartments said chamber being so positioned relative to said discharge means that melted material may be deposited in any selected compartment, means for rotating said fining chamber, an annular water bath adjacent said fining chamber, and a plurality of perforate baskets movably supported in said bath and movable along with said fining chamber whereby the fined material discharged from the respective compartments of said fining chamber is collected by said baskets.

4. In apparatus for the refining of melted porcelain enamel material, the combination with means from which the unrefined material is discharged in melted form, of a rotatable table provided with a segmentally divided annular fining chamber, said table so positioned that the said unrefined material flows into said annular fining chamber, means for relatively rotating said table and said means supplying said unrefined material, said table provided at circumferentially spaced parts with means for separately drawing off the material in the respective sections of said fining chamber, and a water bath so arranged with respect to said table that the refined material drawn off from said table falls into said water bath.

GLENN H. McINTYRE.
GEORGE R. SYLVESTER.